Nov. 3, 1925.
K. L. HUGGINS
1,559,877
SAFETY WHEEL ATTACHMENT FOR VEHICLES
Filed April 1, 1925
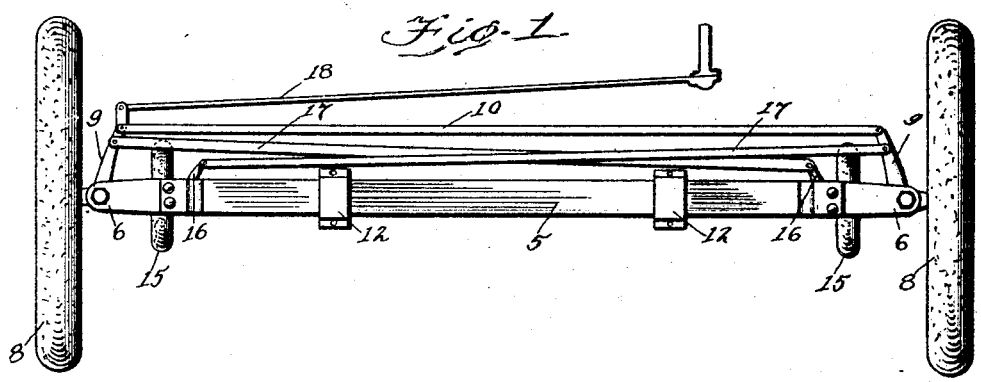
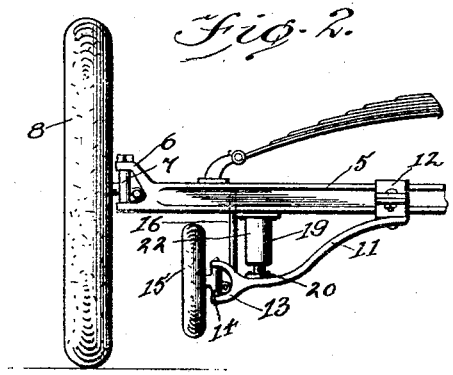
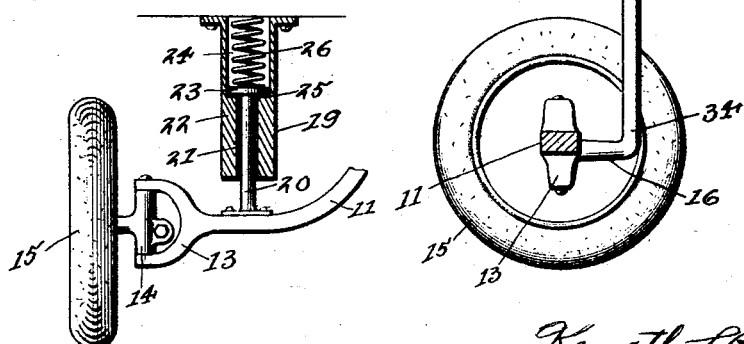
Inventor
Kenneth L. Huggins Patented Nov. 3, 1925.

1,559,877

UNITED STATES PATENT OFFICE.

KENNETH L. HUGGINS, OF SOUTH HARTFORD, NEW YORK.

SAFETY WHEEL ATTACHMENT FOR VEHICLES.

Application filed April 1, 1925. Serial No. 20,014.

*To all whom it may concern:*

Be it known that I, KENNETH L. HUGGINS, citizen of the United States, residing at South Hartford, in the county of Washington and State of New York, have invented certain new and useful Improvements in a Safety Wheel Attachment for Vehicles, of which the following is a specification.

My invention relates to a safety wheel attachment for vehicles, particularly adapted for automobiles and the like.

It is an object of the invention to provide an auxiliary wheel attached to the vehicle adjacent the main wheels which will serve to support and permit operation of the vehicle should the main wheels come off.

A further object of the invention is to provide shock absorbing means associated with the safety wheels, for relieving the wheels of the strain and shock to which they will be subjected when brought into use.

Another object of the invention is to provide an attachment of the above-mentioned character which is simple and durable in construction, reliable and efficient in use, and inexpensive to manufacture.

Other objects and advantages of the invention will be apparent during the course of the following description.

In the accompanying drawing, forming a part of this specification and in which like numerals are employed to designate like parts throughout the same, Fig. 1, is a top plan view of a vehicle axle, showing my invention applied thereto, Fig. 2, is a fragmentary front elevation of the front axle with the invention attached, Fig. 3, is a detail view of the attachment showing the shock absorber in longitudinal section, and, Fig. 4, is a cross sectional view of the attachment showing the arrangement of the steering knuckle arm.

In the drawing, wherein for the purpose of illustration I have shown a preferred embodiment of my invention, the numeral 5 denotes the front axle of a vehicle having a yoke 6 at each end in which the steering knuckles 7 of the wheels 8 are pivotally mounted. As usual the steering knuckle arms 9 are connected together by the tie rod 10, so the wheels will move in unison when turned by the steering rod 18.

Referring more particularly to my invention, an auxiliary axle 11 is clamped to the axle 5, adjacent each end, as at 12, being curved downwardly and extending longitudinally of the axle 5 towards the wheels of the vehicle. A yoke 13 is formed at the free end of the axles 11, in which the knuckles 14 of the safety wheels 15 are pivotally mounted. Each knuckle 14 has an arm 16 which is connected to the opposite knuckle arm 9, of the wheels 8, by rods 17, so the safety wheels will move in unison with the main wheels. The safety wheels are of such diameter as to be normally spaced from the ground and are disposed in spaced parallel relation to the main wheels 8. To absorb the shocks to which the safety wheels are subjected when brought into use, a shock absorber 19 is mounted between the auxiliary axles 11 and axle 5 of the vehicle. The shock absorber consists of an upright plunger 20 mounted on the top of the auxiliary axle, adjacent the yoke thereof, which is slidable in the bore 21 of the cylinder 22 secured to the underside of the axle 5. The upper end of the plunger 20 has an enlarged head 23 formed integral therewith which moves in the upper end of the bore 21 which is enlarged, as at 24, forming a shoulder 25 to limit the downward movement of the plunger. A compression spring 26 is mounted within the bore of the cylinder between the head 23 of the plunger and the axle 5, having sufficient tension to partially resist the upward movement of the plunger.

In Fig. 4, the specific construction of the steering knuckle arms 16 of the safety wheels is shown. The arms are bent upwardly at a right angle to the axle, as at 34, having their upper end connected with the ends of the rods 17 and by reason of this construction will not interfere with obstacles in the roadway passing beneath the center of the vehicle.

Thus, it is seen that a vehicle equipped with these safety wheels will be protected against accidents in event the wheels of the vehicle should come off or be broken. It is of course understood that the vehicle is equipped with four of the wheels, one for each wheel of the vehicle, and should any of the main wheels come off, the auxiliary wheel will be immediately brought into use and will efficiently support the vehicle and permit operation of the same until a service station is reached. While it is true the auxiliary wheels will be subjected to considerable strain when the axle drops, this is partially absorbed by the shock absorbers with which the attachment is equipped.

It is to be understood that the form of my invention herewith shown and described is to be taken as a preferred example of the same and that certain changes in the shape, size and arrangement of the parts may be made without departing from the spirit of the invention or the scope of the subjoined claims:

Having thus described my invention, I claim:

1. The combination with the chassis and wheels of a vehicle, of auxiliary axles depending from the axles of the vehicle wheels, auxiliary wheels mounted on said auxiliary axles in spaced parallel relation to the wheels of the vehicle, steering knuckles for said auxiliary wheels, and means connecting said steering knuckles to the steering knuckles of the vehicle wheels whereby the same will move in unison.

2. The combination with the chassis and wheels of a vehicle, of auxiliary axles suspended from the main axles of the vehicle, auxiliary wheels mounted on said auxiliary axles in spaced parallel relation to the wheels of the vehicle, shock absorbing means mounted between said main axles and auxiliary axles, steering knuckles for said auxiliary wheels and means connecting said steering knuckles to the steering knuckles of the vehicle wheels whereby the same will move in unison.

In testimony whereof I affix my signature.

KENNETH L. HUGGINS.